United States Patent [19]
Bloom

[11] Patent Number: 5,351,592
[45] Date of Patent: Oct. 4, 1994

[54] SAW BLADE

[75] Inventor: Bertil Bloom, Bollnäs, Sweden

[73] Assignee: Sandvik AB, Sandviken, Sweden

[21] Appl. No.: 57,551

[22] Filed: May 6, 1993

[30] Foreign Application Priority Data

May 6, 1992 [SE] Sweden ............................. 9201417-4

[51] Int. Cl.⁵ .............................................. B26D 1/14
[52] U.S. Cl. ......................................... 83/835; 83/663
[58] Field of Search ........................ 83/835, 592, 663; 51/206 R; 125/15

[56] References Cited

U.S. PATENT DOCUMENTS

| | | | |
|---|---|---|---|
| 4,102,231 | 7/1978 | Jägers | 83/854 |
| 4,267,760 | 5/1981 | Smith et al. | 83/835 |
| 5,018,276 | 5/1991 | Asada | 51/206 R X |
| 5,033,579 | 7/1991 | Vanderstraeten | 83/835 X |

FOREIGN PATENT DOCUMENTS 3838844  5/1990  Fed. Rep. of Germany .
821136   4/1981  U.S.S.R. .

Primary Examiner—Richard K. Seidel
Assistant Examiner—Kenneth E. Peterson
Attorney, Agent, or Firm—Burns, Doane, Swecker & Mathis

[57] ABSTRACT

A saw blade for sawing of wood has sides with an uneven synthetic powder lacquer coating with friction properties like the cut wood surfaces to remove the sawdust from the kerf without adhering to either surface. The saw provides lower cutting force and improves the straightness of the cut.

11 Claims, 1 Drawing Sheet

SAW BLADE

BACKGROUND AND SUMMARY OF THE PRESENT INVENTION

Saw blades for sawing of wood have traditionally been made with the flat side smoothly ground or coated with smooth rust-proofing lacquer, to reduce the friction between the saw blade and the sides of the kerf. It is also known to make the sides of the saw blade with sharp cutting or abrasive elements, to improve the smoothness of the cut surfaces by shaving or filing after the teeth have done their cutting, as described in the patents U.S. Pat. Nos. 4,102,231, DE 3 838 844 and SU 821136. Such saw blades create large friction and require large forces, and they have not been widely used.

According to the present invention a saw blade can be made with side surfaces, the structure of which assists in removing sawdust from the kerf without removing any substance from the cut surfaces. This lowers the friction considerably, and makes the saw blade less affected by lateral forces, thereby improving the smoothness and straightness of the cut.

BRIEF DESCRIPTION OF THE DRAWING

A preferred embodiment of the present invention will be described with reference to the accompanying drawings, wherein like members bear like reference numerals, and wherein.

DETAILED DESCRIPTION OF THE PREFERRED EMBODIMENTS

Figure 1:
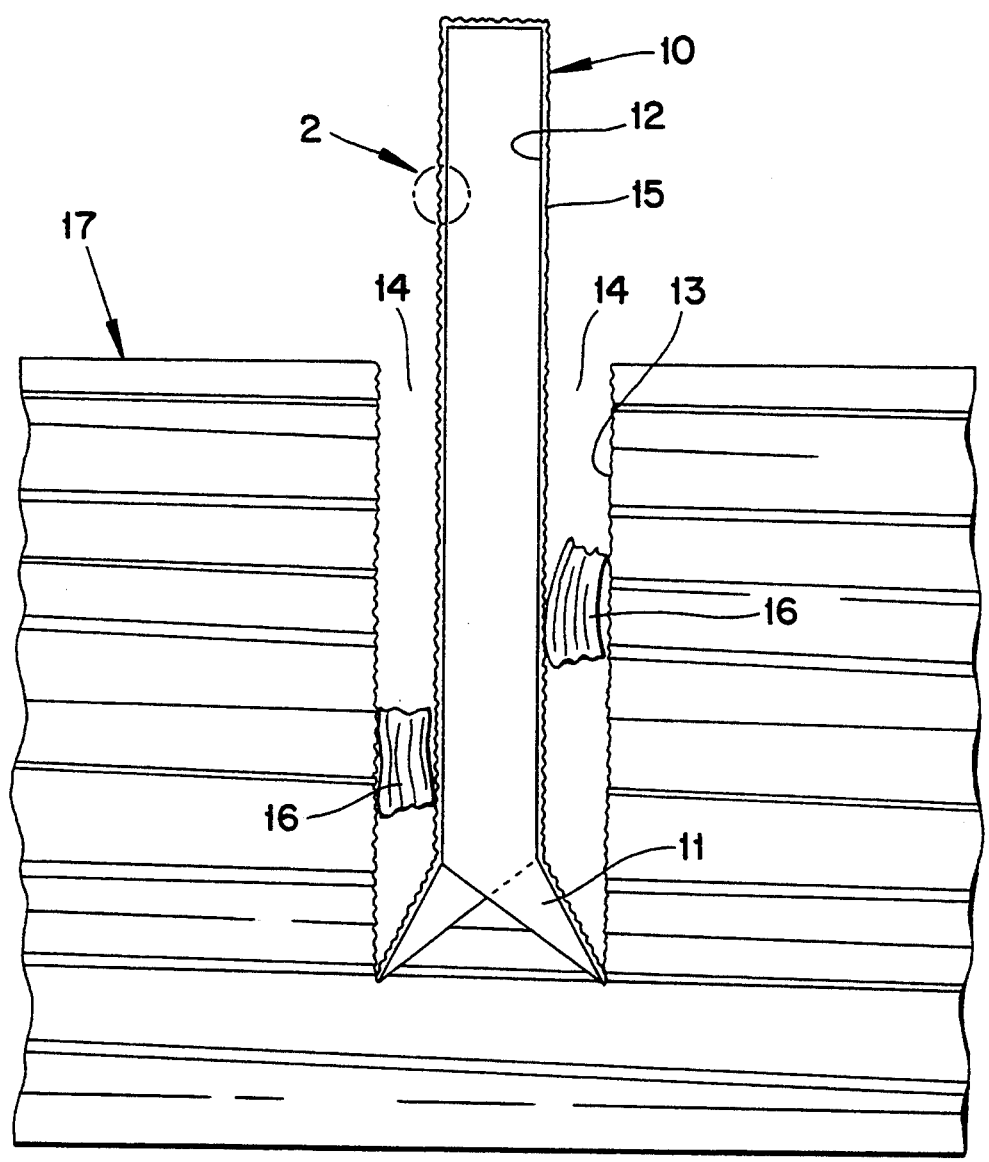
FIG. 1 is a cross-sectional view of a saw blade according to the present invention within a section of wood being cut.
Figure 2:
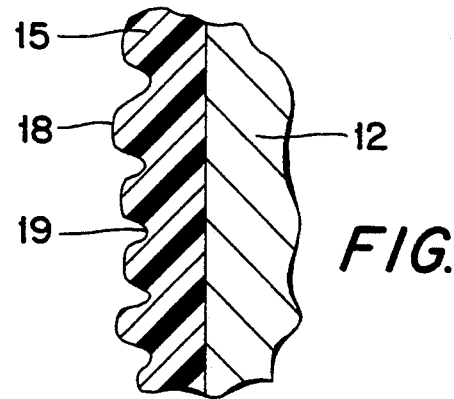
FIG. 2 is an enlarged cross-section of a portion of the saw blade substantially corresponding to the circle 2 in FIG. 1.

A section of a saw blade according to the invention is shown in the figure. The saw blade 10 may be part of a hand tool or of a power tool, such as a circular saw or a sabre saw. The saw blade is flat with side surfaces 12. Teeth 11 are provided along at least part of the periphery or edge, which teeth cut a kerf in the workpiece 17 with a width exceeding the thickness of the saw blade. The teeth 11 can be wider than the thickness of the saw blade or, as shown in the figure, set alternatingly to the left and right side of the length or circumference of the saw blade 10.

During sawing, sawdust 16 collects in the space 14 between the cut surfaces 13 of the wood 17 and the sides 12 of the saw blade, causing increased friction. If the sawdust is not equally distributed, it may force the saw blade 10 to one side causing a crooked or uneven cut.

During sawing with a saw blade of traditional type with smooth sides 12, each particle of sawdust 16 in the space 14 will be affected by a noticeable friction force from the cut surface 13 and by a very small force from the side 12 of the saw blade, with the result that the sawdust stays in the space 14. The saw dust 16 may gradually become compacted and adhere to the cut surface 13. The cutting force will increase until the saw blade 10 is lifted clear of the workpiece and the sawdust removed.

During sawing with a saw blade with abrasive or cutting elements on the sides, each particle of sawdust 16 will be affected by a noticeable friction force from the cut surface 13 and a very large force from the elements on the sides of the saw, with the result that the sawdust will slide and rub against the surface 13 but follow the motion of the saw blade with a strong tendency to adhere to the saw blade. The cutting forces increase when many particles adhere, and it may become necessary to lift the saw blade 10 clear of the workpiece to remove adhering particles manually.

A saw blade according to the present invention has side surfaces 12 with an organic coating surface structure which has a friction and graininess corresponding to the cut surfaces 13. Each particle or particles of sawdust 16 will be affected by equal friction forces from the cut surface 13 and from the sides 12 of the saw blade. This equal force provides the result that the sawdust particles keep rolling between the surfaces 12, 13 without adhering to either of them. The particles are finally transported out of the kerf with a velocity corresponding to one-half the velocity of the saw blade.

The surface structure according to the present invention is preferably achieved by dry powder lacquering to form a layer 15 on the side surfaces 12 of the saw blade. The grain size and firing temperature of the lacquer is chosen to give a grainy surface with a grain size about 0.3 to 0.6 mm and a profile depth about 0.15 to 0.05 mm peak to peak. Suitable types of lacquer are epoxy, polyester or mixtures of these. This surface layer 15 feels clearly uneven to the touch. The convex grain surface peaks 18 should be more rounded than the concave grain surface troughs or valleys 19 to minimize abrasion. The thickness of the layer 15 should be less than the amount of set of the saw teeth 11 to ensure sufficient space 14 between the cut surface 13 and the lacquer layer 15.

Tests with a saw blade with grain size 0.5 mm and profile depth about 0.07 to 0.10 mm in resinous wood show that the cutting force is lowered by 20% and that no sawdust adheres to either the cut surfaces 13 of the wood 17 or the sides 12 of the saw blade 10.

The invention can be applied to any kind of saw blade which is not appreciably deformed during sawing, such as handsaws, sabre saws and circular saws, but not to bandsaws which for their proper guidance depend on sliding contact with metallic guide devices.

The principles, preferred embodiment and mode of operation of the present invention have been described in the foregoing specification. However, variations and changes may be made by others without departing from the spirit of the present invention. Therefore, all such variations and changes that fall within the scope of the claims appended hereto are intended to be embraced thereby.

What is claimed is:

1. A saw blade for sawing of wood, comprising a flat member having cutting teeth along an edge thereof, sides of the flat member having a wholly organic coating with an uneven surface structure having peaks and troughs, the coating having friction and graininess corresponding generally to a surface of cut wood.

2. The saw blade according to claim 1, wherein the surface of the coating has a profile depth of 0.05 to 0.15 mm peak to trough.

3. The saw blade according to claim 2, wherein the coating is a synthetic powder lacquer selected from one of the group consisting of epoxy, polyester or mixtures of these.

4. The saw blade according to claim 2, wherein the peaks of the coating surface are more rounded than the troughs.

5. The saw blade according to claim 1, wherein the coating has a thickness which is less than an amount of outward extension of the cutting teeth relative to a plane of the saw blade.

6. The saw blade according to claim 1, wherein the surface of the coating has a profile depth of 0.07 to 0.10 mm peak to peak.

7. A saw blade for sawing of wood, comprising a flat member having cutting teeth along an edge thereof, sides of the flat member having an organic coating with an uneven surface structure having peaks and troughs, the coating having friction and graininess corresponding generally to a surface of cut wood, the surface of the coating having a profile depth of 0.05–0.15 mm peak to trough.

8. The saw blade according to claim 7, wherein the surface of the coating has a profile depth of 0.07 to 0.10 mm peak to trough.

9. The saw blade according to claim 7, wherein the coating is a synthetic powder lacquer selected from one of the group consisting of epoxy, polyester or mixtures of these.

10. The saw blade according to claim 7, wherein the peaks of the coating surface are more rounded than the troughs.

11. The saw blade according to claim 5, wherein the coating has a thickness which is less than an amount of outward extension of the cutting teeth relative to a plane of the saw blade.

* * * * *